United States Patent
Naoe et al.

(10) Patent No.: US 6,475,598 B1
(45) Date of Patent: Nov. 5, 2002

(54) MAGNETIC RECORDING MEDIUM

(75) Inventors: Koji Naoe; Kiyomi Ejiri; Masahiko Mori, all of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 130 days.

(21) Appl. No.: 09/602,225

(22) Filed: Jun. 23, 2000

(30) Foreign Application Priority Data

Jun. 24, 1999 (JP) .......................................... 11-178224

(51) Int. Cl.$^7$ ................................................ G11B 5/68
(52) U.S. Cl. ...................... 428/141; 428/216; 428/323; 428/336; 428/694 BS; 428/694 BR; 428/694 SG; 428/900
(58) Field of Search ................................ 428/141, 216, 428/336, 694 BS, 694 BR, 323, 900, 694 SG

(56) References Cited

U.S. PATENT DOCUMENTS

| | | | |
|---|---|---|---|
| 5,718,964 A | 2/1998 | Naoe et al. | 428/141 |
| 5,922,454 A | 7/1999 | Inaba et al. | 428/328 |
| 6,045,901 A | 4/2000 | Hashimoto et al. | 428/323 |
| 6,254,964 B1 * | 7/2001 | Saito et al. | 428/141 |

* cited by examiner

*Primary Examiner*—Stevan A. Resan
(74) *Attorney, Agent, or Firm*—Stroock & Stroock & Lavan LLP

(57) ABSTRACT

The present invention provides a magnetic recording medium exhibiting a high C/N ratio as well as having excellent running durability even under high-density magnetic recording.

Disclosed is a magnetic recording medium comprising, on either side of a flexible nonmagnetic support, a nonmagnetic layer containing a nonmagnetic powder and a binder and a magnetic layer containing a ferromagnetic powder and a binder in this order, having an average thickness of said magnetic layer of from 0.01 to 0.3 μm and a total average thickness of said magnetic layer and said nonmagnetic layer of from 0.1 to 1.0 μm, characterized in that the number of projections having a height equal to or higher than 20 nm on the magnetic layer surface measured with AFM (Atomic Force Microscope) is equal to or less than 100 pieces per 30 μm×30 μm square as well as the PSD (Power Spectrum Density) of the magnetic layer surface measured with the AFM is equal to or less than 0.2 nm$^2$ in the wavelength of from of 1 to 5 μm.

13 Claims, No Drawings

MAGNETIC RECORDING MEDIUM

BACKGROUND OF THE INVENTION

1. Field of the Invention

This invention relates to a magnetic recording particulate medium which comprises a flexible support having provided thereon a magnetic layer comprising a ferromagnetic powder and a binder, which exhibits a high output and a good C/N ratio under high-density recording and suitable for recording and reproducing digital signals at high densities.

2. Description of Related Art

In recent years, a recording wavelength tends to be shorter along with high densification, and if the thickness of the magnetic layer is thick, the output tends to be lowered, thereby raising problems such as a self-degaussing loss during recording and a thickness loss during reproducing. Therefore, a magnetic layer is tried to be thinner, but the influence of a nonmagnetic support may easily appear on the surface of the magnetic layer when the magnetic layer having a thickness equal to or less than 2 μm is directly applied to a support, and a deteriorating tendency in electromagnetic characteristics or dropouts is seen.

To solve such problems, there has been proposed a method for forming a thin thickness magnetic layer and a nonmagnetic layer under the magnetic layer on a nonmagnetic support, by using a simultaneous multilayer coating technique as well as a concentrated coating liquid for the magnetic layer as disclosed in Japanese Unexamined Patent Publication (KOKAI) Showa No. 63-191,315 and Japanese Unexamined Patent Publication (KOKAI) Showa No. 63-187,418, thereby obtaining a magnetic recording medium having an improved electromagnetic characteristics.

In the recent digital VCR systems for consumer use or the like, medium noises are required to be further reduced in a magnetic recording particulate medium. It is known that, in the digital VCR systems for consumer use, surface roughness of a wavelength pitch of around 4 μm has an influence on the medium noises. Due to the demands for high output and overwright (O/W) aptitude, the magnetic layer of the tape used for the digital VCR system for consumer use has become thinner to be around 0.1 μm (for example, Japanese Unexamined Patent Publication (KOKAI) Heisei No. 11-185,240). An influence of a magnetic layer on the surface property of the magnetic layer (for example, aggregation, or orientation disorder of the magnetic powder, and the like) becomes small because of a thinner magnetic layer. In contrast, the surface property of the lower layer (nonmagnetic layer) strongly influences the surface property of the magnetic layer. In order to make the surface property of the lower layer nonmagnetic layer smooth, the following methods have been known: a method using acicular particles as the nonmagnetic powder accompanied by the lower layer described in Japanese Unexamined Patent Publication (KOKAI) Heisei No. 4-325,915, a method using squamiform and plate-formed particles as the nonmagnetic powder accompanied by the lower layer described in Japanese Patent No. 2,698,770, and the like. However, with those methods, it was still difficult to reduce the roughness of a wavelength pitch from several micrometer to several decades of micrometer.

A magnetic recording tape can achieve high densification with the increased volume density, by lowering the tape thickness, that is, by making the tape length longer. However, in a magnetic recording particulate tape having the lower layer (nonmagnetic layer) as that of the present invention, the support thickness has been required to be thinner than that of a magnetic recording film tape (or what is called ME tape), in which a magnetic recording layer comprises a vacuum deposited cobalt alloy. As the supports are being thinner, high strength supports stretched in a width direction (TD) are getting in use from the viewpoint of securing a head touching or a running durability. However, such supports, if having micro damages, are easily broken at a coating, calendering, or slitting step, with the result that the production yields are worsen, raising problems in terms of productivity.

From these viewpoints, as for the magnetic recording tapes having a lower layer (nonmagnetic layer), it has been highly required to make the lower layer thinner. It should be noted, however, that when the lower layer is made thinner for a layer structure as described in Japanese Unexamined Patent Publication (KOKAI) Heisei No. 4-325,915 or Japanese Patent No. 2,698,770, a calender molding property would be lowered; or it would be affected by projections on the base surface, aggregations in the upper and lower layers, or additives such as an abrasive and the like, thereby the magnetic layer surface becomes rough, resulting in low output and high noises. Especially, the above phenomenon noticeably appears when the lower layer ranges from 0.1 to 0.5 μm.

SUMMARY OF THE INVENTION

It is an object of the present invention to provide a magnetic recording particulate medium, having a thickness of a magnetic layer equal to or less than 0.3 μm and a total thickness adding up the magnetic layer and a nonmagnetic layer equal to or less than 1.0 μm, exhibiting a high C/N ratio in high-density magnetic recording, and excelling in running durability.

The invention relates to a magnetic recording medium comprising, on either side of a flexible nonmagnetic support, a nonmagnetic layer containing a nonmagnetic powder and a binder and a magnetic layer containing a ferromagnetic powder and a binder in this order, characterized in that said magnetic layer has an average thickness of from 0.01 to 0.3 μm and a total average thickness of said magnetic layer and said nonmagnetic layer is from 0.1 to 1.0 μm, and a number of projections having a height equal to or higher than 20 nm, measured with an AFM (atomic force microscope), on the magnetic layer surface is equal to or less than 100 pieces per 30 μm×30μm square as well as a PSD (Power Spectrum Density) of the magnetic layer surface in the wavelength of from 1 to 5 μm measured with the AFM is equal to or less than 0.2 nm².

In the magnetic recording medium according to the present invention, it is preferred to contain, in at least one of said magnetic layer and said nonmagnetic layer, a diester compound as shown in the following formula (1).

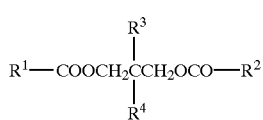

(1)

(In the formula, $R^1$ and $R^2$ represent hydrocarbon groups having a carbon number of from 7 to 12; $R^3$ and $R^4$ represent alkyl groups having a carbon number of from 1 to 6.)

DESCRIPTION OF THE PREFERRED EMBODIMENTS

One of the characteristics of the magnetic recording medium according to the present invention is that the average thickness of the magnetic layer is from 0.01 to 0.3 µm and the total average thickness of the magnetic layer and the nonmagnetic layer is from 0.1 to 1.0 µm.

In the case of recording and reproducing with a conventional magnetic induction head, if the magnetic layer is formed as thin as mentioned above, a magnetization amount becomes small, and are production output is lowered In the case of reproducing with an MR (magneto resistive) head, however, since sensitivity is sufficiently high, a sufficient output can be obtainable and a resolution property, which is an advantage of the thin magnetic layer, can be improved. In other words, by making the average value d of the thickness of the magnetic layer equal to or higher than 0.01 µm, required magnetism can be secured, and by making the average value d equal to or less than 0.3 µm, the resolution property can be enhanced, thereby the C/N ratio in using the MR head can be improved. Particularly, the average value d of the thickness of the magnetic layer preferably ranges from 0.01 µm to 0.2 µm, and more preferably from 0.01 µm to 0.1 µm, from the viewpoint of improvement of the C/N ratio with the MR head.

By making the total average thickness of the magnetic layer and the nonmagnetic layer in the range of from 0.1 to 1.0 µm, a support can be relatively thick, thereby productivity is improved and cost is reduced. Also, because a tape can be thin, the volume recording density can be advantageously increased. The total average thickness of the magnetic layer and the nonmagnetic layer preferably ranges from 0.2 to 0.8 µm, more preferably from 0.3 to 0.6 µm.

Medium noises in the digital VCR system for consumer use can be lowered by making the PSD of the magnetic layer surface measured with the AFM equal to or less than 0.2 $nm^2$ in a wavelength of from 1 to 5 µm. Data signal output can be improved by making the number of projection shaving a height equal to or more than 20 nm on the magnetic layer surface measured with the AFM equal to or less than 100 pieces per 30 µm×30 µm square. That is, the medium C/N ratio can be improved by controlling these values as mentioned above.

In order to improve the C/N ratio by making the PSD of the magnetic layer surface equal to or less than 0.2 $nm^2$ in a wavelength of from 1 to 5 µm, the followings can be taken.

(1) A support (base) having the PSD, measured with the AFM, equal to or lower than 0.15 $nm^2$ in the wavelength of from 1 to 5 µm is used as a surface on which a magnetic layer is formed.

More specifically, a non-filler base is prepared, and then a primer layer containing spherical silica having a particle size ranging from 10 to 20 nm is formed on its surface. On the base to which fillers have been added, the roughness component of the wavelength of from 1 to 5 µm is produced. On the other hand, on the base provided, on the non-filler base, the primer layer containing the spherical silica having a particle size ranging from 10 to 20 nm, the roughness component of the wavelength of from 1 to 5 µm is small and the roughness component of the wavelength equal to or less than 1 µm, especially equal to or less than 0.5 µm, is produced.

In addition, due to the existence of the primer layer containing the spherical silica having the particle size ranging from 10 to 20 nm, a web handling property of the base can be secured. If the aforementioned base is prepared with only particles having a particle size of 10 nm, which are obtained by classification of the spherical silica, the roughness component of the wavelength of from 1 to 5 µm is further reduced. Even in a dual-type base, if a base layer on the magnetic layer side is non-filler one, the roughness component of the wavelength of from 1 to 5 µm is effectively lowered. It is to be noted that, however, if fillers having a large particle size (equal to or larger than 50 nm) are added or the amount of fillers added is increased in the back-side base in the case that the back-side base is thick and the base in the magnetic layer side is thin, it is necessary to properly adjust the thickness ratio between the bases, the particle size and the amount of the fillers added to the back-side. This is because the roughness component of the wavelength of from 1 to 5 µm may become more than 0.15 $nm^2$. In the base provided the primer layer containing the spherical silica, a projection height on the base surface can be adjusted by means of the content of the spherical silica and classification of the particle size thereof. If the spherical silica having a particle size of 10 nm obtained by classification is used and the content is lowered, the number of the surface projections having a height equal to or higher than 20 nm, measured with an AFM, can be adjusted to equal to or less than 100 pieces per 30 µm×30 µm square.

(2) Because a roughness component of the wavelength of from 1 to 5 µm increases by forming coated films for upper and lower layers, it is preferred to control surface roughness caused by forming the coated films, as followings.

① The thickness of the coated films (upper and lower layers) is controlled from 0.1 to 1 µm, preferably from 0.2 to 0.8 µm, more preferably from 0.3 to 0.6 µm in addition to the use of the aforementioned base. Thereby, it is possible to reflect the base surface property.

② By adjusting the thickness d1 of the upper layer to equal to or less than 0.3 µm, preferably equal to or less than 0.12 µm and a ratio (d1/l1) of the thickness d1 to the length l1 of the major axis of the ferromagnetic powder to equal to or less than 4, preferably equal to or less than 2, the orientation disorder of the ferromagnetic powder particles in a thickness direction becomes lower, thereby the surface property and the calender molding property can be improved. By using, as the ferromagnetic powder, flat acicular particles where a minor axis cross section obtained by cutting in a direction perpendicular to the major axis has a long width and a short width, the orientation disorder can be smaller as well the molding property with calendering can be improved, even if the same thickness and the same major axis length are used. The amount of binder in the upper layer magnetic layer preferably ranges from 5 to 30 parts by weight, preferably from 8 to 25 parts by weight with respect to 100 parts by weight of the ferromagnetic powder. In the case that a magnetic powder having the σs equal to or higher than 150 emu/mg is used as well as the thickness of the lower layer is equal to or less than 0.5 µm, the binder amount in the upper layer magnetic layer is preferably equal to or higher than 10 parts by weight. In the case that the thickness of the lower layer is equal to or less than 0.5 µm, migration of the binder from the lower layer to the upper layer hardly occurs. In such a case, an attention should be given in the case of using a magnetic material having a large σs and a smaller binder mount, because aggregational lines might be generated in the longitudinal direction, thereby the surface roughness tends to appear.

③ When a lower layer becomes thin, additives in the upper layer magnetic layer, such as carbon black, an abrasive and the like, are difficult to be pushed into the lower layer, so that the thickness d2 of the lower layer ranges from 0.05 to 0.95 µm, preferably from 0.1 to 0.7 µm, more preferably from 0.2 to 0.5 µm. Provided that f refers to a particle size of a granulated particle having the largest particle size among carbon black, abrasives and the like to be added to the upper layer magnetic layer, it is adequate that d2 is larger than f or d2>f, preferably that d2 is larger than 1.5 multiplied by f or d2>1.5×f, and more preferably that d2 is larger than 2 multiplied by f or d2>2×f. Thereby, such additives in the upper layer magnetic layer as carbon black, abrasives and the like can be pushed into the lower layer to restrain an increase of the projections on the magnetic layer surface as well as an occurrence of the lines by the additives penetrated through the upper layer.

In addition, by using a mixture of acicular nonmagnetic particles and granulated nonmagnetic particles in which the length of the major axis 12 of the acicular nonmagnetic particle ranges from 0.05 to 0.5 μm, preferably from 0.1 to 0.5 μm, the diameter 13 of the granulated nonmagnetic particle is equal to or less than 0.05 μm, and the ratio d2/l2 is equal to or less than 19, preferably equal to or less than 5, more preferably equal to or less than 2, the orientation disorder of the acicular particles in the thickness direction of the lower layer nonmagnetic layer would be restrained, as well as the acicular nonmagnetic particles and the granulated particles would exist in the same plane. In this case, the acicular particles are influenced by the granulated particles, thus to be randomly orientated in the plane, and in the gaps between the acicular particles, the granulated particles would exist. Due to this configuration, the additives in the upper layer magnetic layer such as carbon black, abrasives and the like are easily pushed into the lower layer, and a calender molding property of the lower layer is also improved. Thus, a calender molding property of the upper layer (magnetic layer) can be also enhanced. It is more effective to use as the acicular nonmagnetic powder, a flat acicular nonmagnetic powder where the minor axis cross section obtained by cutting in the direction perpendicular to the major axis has a long width and a short width.

④ As a means to coat a thin lower layer, a method using a nonmagnetic liquid for lower layer having reduced concentration can be exemplified. With this method, coating can be easily done. However, if the concentration of the nonmagnetic liquid for lower layer is reduced, aggregation of nonmagnetic particles in the liquid becomes raised as a problem. Therefore, the amount of the binder used preferably ranges from 5 to 30 parts by weight with respect to 100 parts by weight of the nonmagnetic powder. If the concentration of the nonmagnetic liquid for lower layer is equal to or lower than 18%, it is preferred to use the binder in the range of from 10 to 30 parts by weight with respect to 100 parts by weight of the nonmagnetic powder. If the amount of binder in the lower layer is increased, however, a calender molding property is lowered, resulting in surface roughness, so it is preferred to reduce the binder amount as small as possible within the range capable of securing liquid dispersibility.

As for the binder, a polyurethane resin having a polar group is used, further preferably to use such polyurethane resins as a polyurethane containing cyclic structures and ether groups, a branched aliphatic polyester polyurethane, a polyurethane having a dimer-diol structure or the like.

Because these binders adsorb to the surface of the particles and have long molecular chains having adequate hardness, certain spaces between the particles in the liquid can be secured to restrain aggregation of the particles. In addition, because the aggregation property of the particles in coating and drying can be also restrained, a coated film having less aggregation disorder of the particles can be formed. The above urethane resins maybe used either alone or in combination. The existence ratio of the urethane resins in the binder for the nonmagnetic layer is preferably equal to or higher than 10% by weight, further preferably equal to or higher than 20% by weight. Other than the urethane resins, polyvinyl chloride resins containing polar groups, or hardeners may be contained.

⑤ In the case of enhancing the grain size orientation of the upper layer, it is further preferable to adjust the concentration of the solid content of the liquid so as to reduce the ratio of h/l where a magnetic liquid film thickness immediately after coated is h and a length of the major axis of the acicular magnetic particle is l. The particle orientation of the upper and lower layers can be improved by smoothing the magnetic layer surface with a smooth member at the stage where the coated film is dried to some extent. It is preferable to break the aggregation of particles by applying the shearing force to the coating liquid using a coating head having modified shape of two slits between edges in the case of increasing a coating speed and in the case of an extrusion coating method. Under these conditions, the grain size orientation can be further improved by moderating the initial drying of the coated film so as to restrain eddy flows of the coating liquid.

⑥ A magnetic recording medium having a low height of the projections on the magnetic layer surface and a low roughness component of the wavelength of from 1 to 5 μm can be formed with the following calendering process conditions. It is adequate that a first roller nip consists of metal rollers; the nip line pressure is equal to or higher than 300 kg/cm, preferably equal to or higher than 400 kg/cm; and that the treating speed is equal to or less than 150 m/minute, preferably equal to or less than 100 m/minute, further preferably equal to or less than 30 m/minute. It is preferable that the temperature is occasionally adjusted to in the range of from 70 to 100° C. in view of moldability affected by the Tg, the kinds and the amount of the binder in the upper layer (magnetic layer) and the lower layer (nonmagnetic layer).

Next, the means to secure running durability will be explained.

In making the coated film thin, lubricants, especially esters remarkably splash in coating and drying. Thus, running durability such as still durability is remarkably lowered. This problem can be solved by using the diester compound represented by the general formula (1) supra in which, in comparison with the conventional monoester, evaporation at a high temperature is less and still durability can be secured with a small existence amount on the surface.

If the carbon number of $R^1$ and $R^2$ in general formula (1) is respectively less than 7, evaporation at a high temperature easily occurs. If the carbon number is more than 11, the friction coefficient tends to be high. The diester compound represented by the general formula (1) adequately exists in the binder to restrain the evaporation at coating and drying because of its adequate compatibility with the binder.

By the combination of followings, the running durability can be improved. It is preferable to use, in the upper layer (magnetic layer), the carbon black having the particle size of from 0.02 to 0.1 μm in an amount of from 0.1 to 3 parts by weight, preferably from 0.5 to 2 parts by weight with respect to 100 parts by weight of the ferromagnetic powder, and crush in the aforementioned calendering process to be pushed into the lower layer so that the carbon projections on the magnetic layer surface are lowered as well as the number of the carbon projections necessary for obtaining the friction coefficient is obtained. As for the abrasive in the upper layer magnetic layer, it is preferable, from the viewpoint of securing the durability, to secure the projection height and the existence amount of the abrasive as follows. The number of projections of the abrasive having the size of from 5 to 15 nm is adequately equal to or more than 100 pieces, preferably equal to or more than 500 pieces, further preferably equal to or more than 1000 pieces, per 30 μm×30 μm square in AFM measurement.

In order to control the abrasive projections as mentioned above, the particle size of the abrasive adequately ranges from 0.01 to 0.3 μm, preferably from 0.02 to 0.2 μm. In addition, the abrasive particles are preferably dispersed by zirconia beads or the like, until primary particles are obtained in the liquid. By adding the abrasive in an amount of from 0.5 to 15 parts by weight, preferably from 1 to 5 parts by weight with respect to 100 parts by weight of the ferromagnetic powder, crashing it in the aforementioned calendering process, and pushing it into the lower layer, the abrasive projections on the magnetic layer surface can be lowered as well as the number of the abrasive projections necessary for securing durability can be secured.

The magnetic recording medium according to the present invention is not particularly limited in terms of its layer structure as long as provided at least one of the layers having the aforementioned characteristics on the support. For example, as a magnetic layer, two or more layers having different compositions of the ferromagnetic metal powder may be provided by laminating. In this case, d defined in the present invention is required to be the total sum of the respective layers and to range from 0.1 to 0.3 μm. The standard deviation σ of the thickness of the magnetic layer is preferably equal to or less than 0.05 μm, further preferably in the range of from 0.001 to 0.03 μm.

The magnetic recording medium according to the present invention will be explained further in details as follows.

The ferromagnetic metal powder used in the present invention is not particularly limited, but Fe or alloy having Fe as a main component is preferred. The ferromagnetic metal powder may contain atoms, other than the predetermined atom, such as Al, Mg, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, or B. It is especially preferred to contain, other than Fe, at least one of Al, Mg, Si, Ca, Y, Ba, La, Nd, Co, Ni, and B.

Before dispersed, these ferromagnetic metal powders may be treated with a dispersant, a lubricant, a surfactant, an antistatic agent or the like as described later. It is specifically described in U.S. Pat. No. 3,026,215, U.S. Pat. No. 3,031,341, U.S. Pat. No. 3,100,194, U.S. Pat. No. 3,242,005, U.S. Pat. No. 3,389,014, U.S. Pat. No. 5,591,535 and the like.

The ferromagnetic metal powder may contain a small amount of hydroxides or oxides. Usable are the ferromagnetic metal powder obtained from publicly known manufacturing methods, and the following methods can be exemplified; a method for reducing composite organic acid salts (oxalate, mainly) with a reductive gas such as hydrogen; a method for obtaining Fe, Fe-Co particles or the like by reducing an iron oxide with a reductive gas such as hydrogen; a method for thermally decomposing metal carbonyl compounds; a method for reducing by adding reducing agents such as sodium boron hydride, hypophosphite or hydrazine to a ferromagnetic metal solution; and a method for obtaining a micro powder by evaporating metal in a low-pressure inert gas. The ferromagnetic metal powder thus obtained can be used after subjected to any of the publicly known slow oxidation treatment methods, that is, a method of dipping the powder in an organic solvent before dried, a method of dipping the powder in an organic solvent, feeding thereafter an oxygen-containing gas to form an oxide film on the surface of each powder, and then drying the powder, and a method of adjusting partial pressures of an oxygen gas and an inert gas, without using an organic solvent, to form an oxide coating film on the surface of the powder.

A specific surface area by BET method of the ferromagnetic metal powder used in the magnetic layer of the present invention is preferably selected from 30 to 50 $m^2/g$. With this, good surface property is compatible with low noises.

As a shape of the particle of the ferromagnetic metal powder, an acicular shape, especially a flat acicular shape is preferable, but a granulated shape, a rice grain shape, and a plate shape are also usable.

The average length of the major axis of the particle of the ferromagnetic metal powder is preferably from 0.05 to 0.15 μm, further preferably from 0.08 to 12 μm.

Said length of the major axis is given by suitably combining methods such as a method of photographing a transmission electron microscope photograph and directly reading, from the photograph, a length of the minor axis and a length of the major axis of the particle of the ferromagnetic powder and a method of reading the length of the minor axis and the length of the major axis by tracing a transmission electron microscope photograph with the use of an image analyzing apparatus, IBASSI, manufactured by Carl Zeiss.

An acicular shape ratio of the particle of the ferromagnetic metal powder is preferably from 4 to 18, further preferably from 5 to 12. A moisture content of the ferromagnetic metal powder is preferably from 0.01 to 2%, and the moisture content is preferably optimized depending on the kinds of the binders.

It is preferable to optimize pH of the ferromagnetic metal powder in view of a binder to be used, and the pH range is from 4 to 12, preferably from 7 to 10. The ferromagnetic metal powder may have, on the particle surface, Al, Si, P, those oxides or the like. The amount preferably ranges from 0.1 to 10% by weight with respect to the ferromagnetic metal powder because adsorption of a lubricant such as fatty acid on the surface will be equal to or less than 100 $mg/m^2$. The ferromagnetic metal powder might contain a soluble inorganic ion such as Na, Ca, Fe, Ni or Sr, and the characteristics are slightly affected as long as the content is equal to or lower than 200 ppm.

The ferromagnetic metal powder used in the present invention preferably has fewer voids, and the value of the voids is equal to or less than 20% by volume, further preferably equal to or less than 5% by volume.

Detailed descriptions of the nonmagnetic layer used in the preferred embodiments of the present invention will be made. The nonmagnetic inorganic powder used in the nonmagnetic layer according to the invention may be selected from such inorganic compounds as metal oxide, metal carbonate, metal sulfate, metal nitride, metal carbide and metal sulfide. The inorganic compounds include, for example, α-alumina having an α-conversion rate equal to or higher than 90%, β-alumina, γ-alumina, θ-alumina, silicon carbide, chromium oxide, cerium oxide, α-iron oxide, goethite, corundum, silicon nitride, titanium carbide, titanium dioxide, silicon dioxide, tin oxide, magnesium oxide, tungsten oxide, zirconium oxide, boron nitride, zinc oxide, calcium carbonate, calcium sulfate, barium sulfate, and molybdenum disulfide, and these can be used alone or in combination. Especially preferable are titanium dioxide, zinc oxide, iron oxide, and barium sulfate, and further preferable are titanium dioxide and α-iron oxide.

A particle size of these nonmagnetic inorganic powders is preferably equal to or less than 3 μm, but the same effect can be obtained by combining nonmagnetic inorganic powders having different particle sizes, or by widening, even with one kind of the nonmagnetic inorganic powder, the particle diameter distribution, if necessary. As the particle size of the nonmagnetic inorganic powder, particularly preferable is from 0.01 μm to 0.2 μm. Especially, when the nonmagnetic inorganic powder is granulated metal oxide, the average particle size is preferably equal to or less than 0.08 μm; when the powder is acicular metal oxide, the length of the major axis is equal to or less than 0.3 μm, more preferably equal to or less than 0.2 μm. It is to be noted that measurement of the particle size of the nonmagnetic inorganic powder is the same as that of the ferromagnetic metal powder as mentioned above. The tap density is from 0.05 to 2 μ/ml, preferably from 0.2 to 1.5 μ/ml. The moisture content of the nonmagnetic inorganic powder is from 0.1 to 5% by weight, preferably from 0.2 to 3% by weight, further preferably from 0.3 to 1.5% by weight. The pH of the nonmagnetic inorganic powder is from 2 to 11, but especially preferable is pH between 7 and 10. The specific surface area of the nonmagnetic inorganic powder is from 1 to 100 $m^2/g$, preferably from 5 to 70 $m^2/g$, more preferably from 10 to 65 $m^2/g$. The crystallite size of the nonmagnetic inorganic powder is preferably from 0.004 μm to 1 μm, further preferably from 0.04 μm to 0.1 μm. The oil absorption amount utilizing dibutyl phthalate (DBP) is from 5 to 100 ml/100 g, preferably from 10 to 80 ml/100 g, and further preferably from 20 to 60 ml/100 g. The specific gravity is from 1 to 12, preferably from 3 to 6. The shape may be any one of an acicular shape, sphere shape, polygon shape, or plate shape.

It is considered that the ignition loss is preferably equal to or lower than 20% by weight, but the most preferable is zero. The aforementioned nonmagnetic inorganic powder used in the present invention has the Mohs' scale of hardness of from 4 to 10. The roughness factor of the powder surface is preferably from 0.8 to 1.5, and more preferably, the roughness factor is from 0.9 to 1.2. The absorption amount of SA (stearic acid) of the nonmagnetic inorganic powder is from 1 to 20 $\mu mol/m^2$, preferably from 2 to 15 $\mu mol/m^2$. The wetting heat to water at 25° C. in the nonmagnetic inorganic powder preferably ranges from 200 $erg/cm^2$ to 600 $erg/cm^2$. Also, a solvent having the wetting heat in this range can be used. The water molecule weight of the surface is adequately from 1 to 10 pieces/100 angstroms at 100 to 400° C. The pH at the isoelectric point in water is preferably between 3 and 9.

These nonmagnetic inorganic powders are preferably subjected to surface treatment to form at least a part of the surface covered with $Al_2O_3$, $SiO_2$, $TiO_2$, $ZrO_2$, $SnO_2$, $Sb_2O_3$ or ZnO. The surface treatment resulting in good dispersibility is one covered with $Al_2O_3$, $SiO_2$, $TiO_2$, $ZrO_2$, and preferably with $Al_2O_3$, $SiO_2$ or $ZrO_2$. These may be used either in combination or alone. Moreover, a surface-treated layer prepared by coprecipitation may be used in view of the purpose. The surface treatment may be covering with alumina on the surface of nonmagnetic inorganic powder, followed by covering with silica and vice versa. The surface-treated layer may be a porous layer used according to the purpose, but it is preferably homogeneous and dense in general.

The specific examples of the nonmagnetic inorganic powders used in the nonmagnetic layer of the present invention include Nanotite manufactured by Showa Denko K. K., HIT-100 and ZA-G1 manufactured by Sumitomo Chemical Co. Ltd., DPN-250, DPN-250BX, DPN-245, DPN-270BX, DPB-550BX, and DPN-550RX manufactured by Toda Kogyo Corporation, titanium oxide TTO-51B, TTO-55A, TTO-55B, TTO-55C, TTO-55S, TTO-55D, SN-100, MJ-7 α-iron oxide E270, E271, and E300 manufactured by Ishihara Sangyo Co. Ltd., STT-4D, STT-30D, STT-30, and STT-65C manufactured by Titan Kogyo K. K., MT-10S, MT-10TO, MT-150W, MT-500B, MT-600B, MT-100F, and MT-500HD manufactured by Tayca Corporation. Also, FINEX-25, BF-1, BF-10, BF-20 and ST-M manufactured by Sakai Chemical Industry Co., Ltd., DEFIC-Y and DEFIC-R manufactured by Dowa Mining Co., Ltd., AS2BM and TiO2P25 manufactured by Nippon Aerosil Co., Ltd., 100A and 500A manufactured by Ube Industries Co. Ltd., and Y-LOP manufactured by Titan Kogyo K. K., and sintered products thereof can be exemplified.

Particularly preferable as the nonmagnetic inorganic powder are titanium dioxide and α-iron oxide. The α-iron oxide (hematite) is prepared under following conditions. The $\alpha$-$Fe_2O_3$ powder uses acicular goethite particles as precursor particles, the acicular goethite particle obtained by the following general methods; (1) a method for generating acicular goethite particles by conducting oxidation reaction by aerating a suspension with oxygen-containing gas under a pH equal to or higher than 11, at a temperature equal to or less than 80° C., where the suspension contains ferrous hydroxide colloid obtained by adding a ferrous aqueous solution with the equivalent or more of an aqueous solution of alkali hydroxide; (2) a method for generating spindle-shaped goethite particles by conducting oxidation reaction by aerating a suspension with an oxygen-containing gas, where the suspension contains $FeCO_3$ obtained by reacting an aqueous solution of ferrous salt with an aqueous solution of alkali carbonate; (3) a method for generating acicular goethite nucleus particles by conducting oxidation reaction by aerating an aqueous solution of ferrous salt with oxygen-containing gas, where the aqueous solution of ferrous salt contains ferrous hydroxide colloid hydroxide obtained by adding a ferrous aqueous solution with less than equivalent of an aqueous solution of alkali hydroxide or an aqueous solution of alkali carbonate, and then growing the acicular goethite nucleus particles by adding the aqueous solution of ferrous salt containing the acicular goethite nucleus particles with the equivalent or more (with respect to $Fe^{2+}$) of an aqueous solution of alkali hydroxide in the aqueous solution of ferrous salt followed by aeration with the oxygen-containing gas; and (4) a method for generating acicular goethite nucleus particles by conducting oxidation reaction by aerating an aqueous solution of ferrous salt with oxygen-containing gas where the aqueous solution of ferrous salt contains ferrous hydroxide colloid obtained by adding a ferrous aqueous solution with less than equivalent of an aqueous solution of alkali hydroxide or an aqueous solution of alkali carbonate, and then growing the acicular goethite nucleus particles in an acid or a neutral area.

It is to be noted that no obstructions occur if heterogeneous elements such as Ni, Zn, P, Si or the like, which are generally added during the generating reaction of the goethite particles for improving characteristics of the particle powder or the like, are added.

The acicular goethite particles as precursor particles are dehydrated at a temperature in the range of from 200 to 500° C., or further subjected, if necessary, to annealing through a heating treatment at a temperature in the range of from 350 to 800° C., thus to obtain acicular $\alpha$-$Fe_2O_3$ particles.

It is to be noted that no obstructions occur if the acicular goethite particles to be subjected to dehydration or annealing are adhered with, as an anti-sintering agent, a compound containing P, Si, B, Zr, Sb or the like on its surface.

The reason why the annealing by the heat treatment at a temperature in the range of from 350 to 800 ° C. is conducted is that it is preferable to melt, through annealing, the utmost surface of the particle to make voids filled, the voids being generated at the particle surface of the acicular α-$Fe_2O_3$ particle obtained by dehydration, thus to provide a smooth surface configuration.

In addition, the acicular α-$Fe_2O_3$ particles thus obtained through hydration or annealing are dispersed in an aqueous solution to obtain a suspension, and after, for example, adding an Al compound and adjusting pH, the surface of said α-$Fe_2O_3$ particles are coated with the Al compound. Then, treatments such as filtration, rinsing, drying, grinding and, if necessary, further deaeration and compaction or the like may be performed. Concerning the Al compound to be used, usable is an aluminum salt such as aluminum acetate, aluminum sulfate, aluminum chloride, aluminum nitrate or the like, or alkali aluminate such as soda aluminate or the like. The amount of Al compound to be added in this case is normally from 0.01 to 50% by weight with respect to the powder of α-$Fe_2O_3$ in terms of Al. The particles can be coated, together with the Al compound, by an Si compound, or one or more compounds selected from P, Ti, Mn, Ni, Zn, Zr, Sn, and Sb. The respective added amount of these compounds to be used with the Al compound is generally in the range of from 0.01 to 50% by weight with respect to the α-$Fe_2O_3$ powder.

Method for manufacturing the titanium dioxide will be described hereinafter. Manufacturing titanium dioxide can be mainly accomplished by a sulfuric acid method and achlorine method. In the sulfuric acid method, ilmenite ore is digested with sulfuric acid to extract Ti, Fe and the like as sulfates. The iron sulfate is crystallized and separated, thus to be removed, and then the residual titanyl sulfate solution is purified by filtration, and then thermally hydrolyzed to cause hydrous titanium oxide to be deposited. After filtering and washing the hydrous titanium oxide, the mixed impurities are removed by washing, and then the hydrous titanium oxide after added with a particle diameter adjuster or the like is then subjected toa sintering process at 800° C. to 1000° C., thereby producing coarse titanium oxide. The type is classified into a rutile type and an anatase type according to the kind of a nucleus agent which is added on hydrolyzation. The coarse titanium oxide is subjected to crashing, sizing, surface treatments or the like for manufacturing. In the chlorinemethod, on the other hand, natural rutile or synthetic rutile is used as the ore. The ore is chlorinated in a high temperature reduced condition so that Ti is converted to $TiCl_4$ and Fe is converted to $FeCl_2$. The iron oxide solidified by a cooling process is then separated from liquid of $TiCl_4$. The coarse $TiCl_4$ thus obtained is refined by rectification, and it is added with a nucleating agent and then reacted momentarily with oxygen at the temperature equal to or higher than 100° C., there by producing coarse titanium oxide. The method of a finishing treatment to provide the coarse titanium oxide thus generated in this oxidative decomposition process with the pigmentary characteristics is the same as that in the sulfuric acid method.

The surface treatment is carried out, after dry ground process of said titanium oxide, as to add water and a dispersant, followed by classification of the coarse particles by wet ground process and centrifugation. Then, the micro particle slurry is transferred into a surface treatment tank, where the surface of the metal hydroxide is coated. First, an aqueous solution of salts such as Al, Si, Ti, Zr, Sb, Sn, Zn or the like with a predetermined amount is added, and then the acid or alkali for neutralizing the solution is also added, thus to generate a hydrous oxide with which the surfaces of the particles of the titanium oxide are coated. The by-product water-soluble salts are removed by decantation, filtration and washing, and finally, the pH of the slurry is adjusted and the slurry is filtered and then rinsed with pure water. A cake after washed is then dried with a spray drier or a band drier. As a final step, this dried material is ground by a jet mill to become products. Instead of being treated in an aqueous system, it is also possible to perform the surface treatment by passing vapor of $AlCl_3$, $SiCl_4$ through the titanium oxide powder, and then by introducing water vapor thereinto. As for other methods for manufacturing the pigments, "Characterization of Powder Surfaces" G. D. Parfitt and K. S. W. Sing, published by Academic Press, 1976 can be referred to.

When carbon black is contained in the nonmagnetic layer, not only the Rs can be reduced and the light transmittance can be small, as publicly known effects, but also a desired micro Vickers hardness can be obtained.

The micro Vickers hardness of the nonmagnetic layer is normally from 25 to 60 $Kg/mm^2$, preferably from 30 to 50 $Kg/mm^2$, measured with a thin film durometer HMA-400 manufactured by NEC using, at a pad tip, a triangular pyramid probe made of diamond with a ridge degree of 80 and a tip radius of 0.1 μm. As for the light transmittance, it is standardized that an absorption of infrared rays in the wavelength of around 900 nm is normally equal to or less than 3%; for example, in the case of VHS, it is equal to or less than 0.8%. For this, furnace black for rubbers, thermal for rubbers, black for coloring, acetylene black or the like can be utilized.

The carbon black contained in the nonmagnetic layer. has the specific surface area of, normally, from 100 to 500 $m^2/g$, preferably from 150 to 400 $m^2/g$, the DBP oil absorption amount of, normally, from 20 to 400 ml/100 μ, preferably from 30 to 200 ml/100 g. The particle size of carbon black is normally from 5 nm to 80 nm, preferably from 10 to 50 nm, further preferably from 10 to 40 nm. Generally, it is preferable for carbon black to have a pH of from 2 to 10, a moisture content of from 0.1 to 10%, and a tap density of from 0.1 to 1 μ/ml. Specific examples of carbon blacks for use in this invention include BLACK PEARLS 2000, 1300, 1000, 900, 800, 880, 700, and VULCAN XC-72 manufactured by Cabot Corporation; #3050B, 3150B, 3250B, #3750B, #3950B, #950, #650B, #970B, #850B and MA-600 manufactured by Mitsubishi Chemical Corp.; CONDUCTEX SC, RAVEN 8800, 8000, 7000, 5750, 5250, 3500, 2100, 2000, 1800, 1500, 1255, and 1250 manufactured by Columbia Carbon Co. Ltd.; and Ketjen black EC manufactured by Lion Akzo Co., Ltd. These carbon blacks may be ones surface-treated with a dispersant or grafted with resin, and ones whose surface has been partly graphitezed. Further, before added to a coating liquid, the carbon black maybe dispersed in advance into the binder. These carbon blacks can be used within the range of less than 50% by weight with respect to said inorganic powder and within the range of less than 40% by weight with respect to the total weight of the nonmagnetic layer. These carbon blacks can be used alone or in combination.

As for the carbon blacks usable in the nonmagnetic layer, for example, "Carbon Black Binran" edited by Carbon Black Association can be referred.

In addition, the nonmagnetic layer can be added with organic powder according to the purpose. For example, acryl styrene based resin powder, benzoguanamine resin powder, melamine based resin powder, and phthalocyanine based pigment can be exemplified, but followings can be used such as polyolefin based resin powder, polyester based resin powder, polyamide based resin powder, polyimide based resin powder, and a polyfluorethylene resin. As the method for manufacturing those above, methods described in Japanese Unexamined Patent Publication (KOKAI) Showa No. 62-18564, Japanese Unexamined Patent Publication (KOKAI) Showa No. 60-255827, or the like can be used.

An undercoat layer is formed in the ordinary magnetic recording medium for the purpose of improving adhesive force between the support and the magnetic layer or the nonmagnetic layer where solvent-soluble polyester is used and the thickness is normally equal to or less than 0.5 $\mu$m.

The binder resins, lubricants, dispersants, additives, solvents, dispersing methods and others used in the nonmagnetic layer can apply those used in the magnetic layer. In particular, publicly known techniques for magnetic layer can be applied to those relating to the binder resin amounts, the kinds, additives, the added amounts of the dispersants, and the kinds.

As for thermoplastic resins usable in the magnetic layer and the nonmagnetic layer, it is preferable to have the glass transition temperature of from −100 to 150 ° C., the number average molecular weight of from 1,000 to 200,000, preferably from 10,000 to 100,000, the polymerization degree of about from 50 to 1,000. Examples thereof include polymers or copolymers containing the following compounds as a constituting unit, such as vinyl chloride, vinyl acetate, vinyl alcohol, maleic acid, acrylic acid, acrylate, vinylidene chloride, acrylonitrile, methacrylic acid, methacrylate, styrene, butadiene, ethylene, vinyl butyral, vinyl acetal andvinyl ether; polyurethane resins and various rubber based resins.

In addition, examples of thermosetting resins or reactive type resins include phenol resins, epoxy resins, polyurethane thermosetting type resins, urea resins, melamine resins, alkyd resins, acrylic based reactive resins, formaldehyde resins, silicone resins, epoxy-polyamide resins, a mixture of polyester resin and isocyanatepre-polymer, a mixtures of polyesterpolyol and polyisocyanate, a mixture of polyurethane and polyisocyanate and the like. The details about these resins are described in "Plastic Handbook", published by Asakura Shoten. Moreover, publicly known electron radiation curing resins can be used in the nonmagnetic layer or in the magnetic layer.

The resins mentioned above can be used alone or in combination. As the preferred resins, a combination of polyurethane resins and at least one resin selected from vinyl chloride resins, vinyl chloride-vinyl acetate resins, vinyl chloride-vinyl acetate-vinyl alcohol resins, vinyl chloride-vinyl acetate-maleic anhydride copolymers, or these resins combined with polyisocyanate can be exemplified. As the structure of the polyurethane resin, publicly known resin such as polyester-polyurethane, polyether-polyurethane, polyether-polyester-polyurethane, polycarbonate-polyurethane, polyester-polycarbonate-polyurethane, polycaproractone-polyurethane, polyolefin-polyurethane or the like can be used. In particularly, aforementioned polyurethane constituted of a short-chain diol having a cyclic structure and a long-chain diol containing an ether group is preferred. With respect to all binders showed here, at least a polar group selected from —COOM, —SO$_3$M, —OSO$_3$M, —-P=O(OM)$_2$, —O—P=O(OM)$_2$ (where M represents an hydrogen atom or an alkali metal base), —OH, —NR$_2$, =N$^+$R$_3$ (where R represents an hydrocarbon group), an epoxy group, —SH, —CN, sulfobetain, phosphobetain, carboxybetain or the like, introduced through copolymerization or addition reaction is preferably used, if necessary, to obtain further excellent dispersibility and durability. The amount of such polar groups is preferably from $10^{-1}$ to $10^{-8}$ mol/g, more preferably from $10^{-2}$ to $10^{-6}$ mol/g.

Specific examples of these binders used in the present invention include VAGH, VYHH, VMCH, VAGF, VAGD, VROH, VYES, VYNC, VMCC, XYHL, XYSG, PKHH, PKHJ, PKHC, and PKFE manufactured by Union Carbide Corporation; MPR-TA, MPR-TA5, MPR-TAL, MPR-TSN, MPR-TMF, MPR-TS, MPR-TM, and MPR-TAO manufactured by Nissin Kagaku Kogyo K. K.; 1000W, DX80, DX81, DX82, DX83, and 100FD manufactured by Denki Kagaku Kogyo K. K.; MR-104, MR-105, MR110, MR100, and 400X-110A manufactured by Nippon Zeon Co., Ltd.; Nippollan N2301, N2302, and N2304 manufactured by NIPPON POLYURETHANE Co., Ltd.; Pandex T-5105, T-R3080, T-5201, Burnock D-400, D-210-80, Crisvon 6109, and 7209 manufactured by Dainippon Ink And Chemicals, Incorporated.; Vylon UR8200, UR8300, RV530, and RV280 manufactured by Toyobo Co., Ltd.; Daipheramine 4020, 5020, 5100, 5300, 9020, 9022, and 7020 manufactured by Dainichiseika Color & Chemicals Mfg. Co., Ltd.; MX 5004 manufactured by Mitsubishi Kasei Corporation; Sunprene SP-150, and TIM-3003 manufactured by Sanyo Chemical Industries Co., Ltd.; Salan F310 and F210 manufactured by Asahi Chemical Industry Co., Ltd., and the like. Among those above, preferable are MR-104, MR110, UR-8200, UR8300 and UR-8700, and also a polyurethane as a reaction product having diol and organic diisocyanate as a main raw material as well as having a cyclic structure and an ether group is preferable.

In the case where polyurethane is used in the present invention, it is preferred that the elongation at break is from 100 to 2,000% , the stress at break is from 0.05 to 10 Kg/cm$^2$, and the yield point is from 0.05 to 10 Kg/cm$^2$.

As for isocyanates used in the present invention, isosyanates such as tolylene diisocyanate, 4,4'-diphenylmethane diisosyanate, hexamethylene diisocyanate, xylylene diisosyanate, naphtylene-1,5-diisosyanate, o-toluidine diisosyanate, isophorone diisocyanate, triphenylmethane triisocyanate or the like, products of these isocyanates with polyalcohols, or polyisocyanates producted by to condensation of isocyanates are preferable. These isocyanates are commercially available under the following trade names; Coronate L, Coronate HL, Coronate 2030, Coronate 2031, Millionate MR, and Millionate MTL manufactured by Nippon Polyurethane Co.Ltd.; Takenate D-102, Takenate D-100N, Takenate D-200, and Takenate D-202 manufactured by Takeda Chemical Industries Co. Ltd.;

Desmodule L, Desmodule IL, Desmodule N, and Desmodule HL manufactured by Sumitomo Bayer Co. Ctd., and so on. For both the nonmagnetic layer and the magnetic layer, these can be used alone, or in combination of two or more by taking advantage of a difference in curing reactivity.

These polyisocyanates are used normally in the range of from 0 to 50% by weight, preferably from 0 to 30% by weight with respect to the total binder resin of the magnetic layer; these polyisocyanates are used normally in the range of from 0 to 40% by weight, preferably from 0 to 25% by weight with respect to the total binder resin of the nonmagnetic layer.

In the case where the magnetic recording medium of the present invention is constituted of two or more layers, as a matter of course, the binder resin amount, the amounts of vinyl chloride based resin, polyurethane resin, polyisocyanate or other resin in the binder, the molecular weight of each resin which forms the magnetic layer, the amount of the polar group, the aforementioned physical properties of the resin or the like can be varied, if necessary, between the nonmagnetic layer and the magnetic layer. Also, publicly known techniques relating to multilayer magnetic layers are applicable.

The carbon blacks exemplified in the nonmagnetic layer are also applicable to the magnetic layer of the present invention.

Before added to a magnetic paint, the carbon black may be dispersed into a binder in advance. These carbon blacks can be used either alone or in combination. In the case of using the carbon black, it is preferable to use the carbon black in an amount of from 0.1 to 3% by weight, preferably from 0.5 to 2% by weight, further preferably from 0.5 to 1% by weight with respect to the amount of a ferromagnetic metal powder. The carbon black has functions in the magnetic layer to prevent static buildup, to reduce the friction coefficient, to lessen light-transmittance, or to improve strength for coating. These effects are different depending on kinds of carbon black. Therefore, it is, as a matter of course, possible in the invention to properly use carbon black different in kinds, amount and combination, according to the purpose, between the magnetic layer and the nonmagnetic layer depending on the mentioned properties such as particle size, oil absorption amount, electrical conductivity, pH or the like. As for the examples of the carbon black usable in the invention, Carbon Black Binran (Carbon Black Handbook) edited by Carbon Black Association, for example, can be referred.

As for the abrasives used in the present invention, publicly known materials having 6 or higher on Mohs' scale can be used alone or in combination; for example, α-alumina having an α-conversion rate equal to or higher than 90%, β-alumina, silicon carbide, chromium oxide, ceriumoxide, α-iron oxide, corundum, artificial diamond, silicon nitride, titanium carbide, titanium dioxide, silicon dioxide, boron nitride and zirconium oxide. A composite composed of two or more of these abrasives (e.g., one obtained by surface-treating one abrasive with another) may also be used. Although these abrasives may contain compounds or elements other than the main component in some cases, the same effect is obtainable if the content of the main component is equal to or higher than 90% by weight. The particle size of these abrasives is preferably from 0.01 to 0.3 μm. However, the same effect is given by combining abrasives different in particle size or enhancing the distribution of the particle size even in the case of using the abrasive alone. The abrasive preferably has a tap density of from 0.2 to 2 μ/cc, a moisture content of from 0.1 to 5%, a pH of from 2 to 11, and a specific surface area of from 1 to 100 m$^2$/g.

Although the particles of the abrasives used in the present invention may have any of an acicular, spherical, and cubical shape, particles having corners on the part of the shape is preferred because of its good abrasive property. Specific examples of the abrasive used in the present invention include AKP-50, HIT-50, HIT-60A, HIT-70, HIT-80, HIT-80G, and HIT-100 manufactured by Sumitomo Chemical Co., Ltd.; G5 manufactured by Nippon Chemical Industrial Co., Ltd.; and TF-100 and TF-140 manufactured by Toda Kogyo K. K, and the like. It is, as a matter of course, possible in the invention. to properly use abrasives different in kinds, amount and combination, according to the purpose, between the magnetic layer and the nonmagnetic layer. These abrasives may be added into the magnetic paints after dispersing treatment in advance with the binder. The number of the abrasive particles existing on the surface and the side faces of the magnetic layer of the magnetic recording medium of the present invention is preferably equal to or higher than 5 pieces/100 μm$^2$.

As the additives used in the present invention, the additives having the lubricating effects, the antistatic effects, the dispersing effects, the plasticizing effects, or the like, are used. Examples of the additives include molybdenum disulfide; tungsten graphite disulfide; boron nitride; graphite fluoride; a silicone oil; silicones having a polar group; fatty acid-modified silicones; fluorine-containing silicones; fluorine-containing alcohols; fluorine-containing esters; polyolefins; polyglycols; alkylphosphoric esters and their alkali metal salts; alkylsulfuric esters and their alkali metal salts; polyphenyl ethers; fluorine-containing alkylsulfuric esters and their alkali metal salts; monobasic fatty acids having a carbon number of 10 to 24 which may contain an unsaturated bond or bonds or may be branched and their metal salts(e.g., Li, Na, K, Cu); monohydric, dihydric, trihydric, tetrahydric, pentahydric and hexahydricalcohols having a carbon number of 12 to 22 which may contain an unsaturated bond or bonds or may be branched; alkoxy alcohols having a carbon number of 12 to 22 which may contain an unsaturated bond or bonds or may be branched; monofatty acid esters, difatty acid esters, or trifatty acid esters comprising any of monobasic fatty acids having a carbon number of 10 to 24 which may contain an unsaturated bond or bonds or may be branched; and monohydric, dihydric, trihydric, tetrahydric, pentahydric and hexahydric alcohols having a carbon number of 2 to 12 which may contain an unsaturated bond or bonds or to be branched; fatty acid esters of a monoalkyl ethers of alkylene oxide polymerized products; fatty acid amides having a carbon number of 8 to 22; and aliphatic amines having a carbon number of 8 to 22.

Specifically, examples of the additives include lauric acid, myristic acid, palmitic acid, stearic acid, behenic acid, butyl stearate, oleic acid, linolic acid, linolenic acid, elaidic acid, octyl stearate, amyl stearate, iso-octyl stearate, octyl myristate, butoxyethyl stearate, anhydrosorbitan monostearate, anhydrosorbit and istearate, anhydrosorbitan tristearate, oleyl alcohol, and lauryl alcohol. It is also possible tousenonionic surfactants, such as alkyleneoxide based, glycerin based, glycidol based, and alkylphenolethylene oxideadducts; cationicsurfactants, such as cyclicamines, ester amides, quaternary ammonium salts, hydantoin derivatives, heterocycles, phosphoniums or sulfoniums; anionic surfactants containing acidic groups, such as carboxylic acid, sulfonic acid, phosphoric acid, sulfuric ester group and a phosphoric ester group; and ampholytic surfactants, such as amino acids, amino sulfonic acids, sulfuric or phosphoric esters of amino alcohols and alkyl betaine type. Details of these surfactants are described in, for example, "A Guide to Surfactants" (published by Sangyo Tosho Co. Ltd.). The lubricants, the antistatic agents and the like, need not be 100% pure but may contain impurities, such as isomers, unreacted materials, side reaction products, decomposition products and oxides in addition to the main components. The content of these impurities is preferably equal to or less than 30% by weight, more preferably equal to or less than 10% by weight.

These lubricants and surfactants usable in the present invention may be different in kinds and amount between the nonmagnetic powder and the magnetic powder according to the purpose. It is conceivable, for example, to control bleeding on the surface with use of fatty acids having different melting points between the nonmagnetic layer and the magnetic layer, to control bleeding on the surface with use of esters having different boiling points and polarities, to improve the coating stability by adjusting the amount of surfactants, to improve the lubricant effects by increasing the amount of the lubricants added to the nonmagnetic layer or the like. Such designing is not limited to the above examples as a matter of course.

All or some of the additives used in the present invention may be added at any stage of the manufacturing process for the magnetic paint; for example, they may be mixed with the ferromagnetic metal powder before a kneading step; added at a kneading step for kneading the ferromagnetic metal powder, the binder, and the solvent; added at a dispersing step; added after dispersing; or added immediately before coating. The purpose may be accomplished by coating a part or all of the additives by simultaneous or sequential coating, after the magnetic coated layer is coated in accordance with the purpose. The lubricants may be coated on the surface of the magnetic layer depending on the purpose, after calendar processing or making slits.

The lubricants usable in the present invention are available under the trade names of, for example, NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, hydrogenated castor oil fatty Acid, NAA-42, NAA-44, Cation SA, Cation MA, Cation AB, Cation BB, Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion 0–2, Nonion LP-20R, Nonion PP-40R, Nonion SP-60R, Nonion OP-80R, Nonion OP-85R, Nonion LT-221, Nonion ST-221, Nonion TO-221, Monogly MB, Nonion DS-60, Anon BF, Anon LG, Butyl Stearate, Butyl Laurate, and Erucic Acid manufactured by NOF corp.; Oleic Acid manufactured by Kanto Chemical Co., Ltd; FAL-205 and FAL-123 manufactured by Takemoto Yushi K. K.; NJLUB LO, NJLUB IPM, and Sansosyzer E4030 manufactured by New Japan Chemical Co., Ltd.; TA-3, KF-96, KF-96L ,KF96H, KF410, KF420, KF965, KF54, KF50, KF56, KF907, KF851, X-22-819, X-22-822, KF905, KF700, KF393, KF-857, KF-860, KF-865, X-22-980, KF-101, KF-102, KF-103, X-22-3710, X-22-3715, KF-910, and KF-3935 manufactured by Shin-Etsu Chemical Co., Ltd.; Armide P, Armide C, and Armoslip CP manufactured by LionArmour Co., Ltd.; Duomine TDO manufactured by Lion Corp.; BA-41G manufactured by Nisshin Oil Mills, Ltd.; Profan 2012E, Newpole PE61, Ionet MS-400, Ionet MO-200, Ionet DL-200, Ionet DS-300, Ionet DS-1000, and Ionet DO-200 manufactured by Sanyo Chemical Industries Ltd.

Organic solvents may be used at the optional ratio in the present invention. Examples of the organic solvents include ketones, such as acetone, methyl ethyl ketone, methyl isobutyl ketone, diisobutyl ketone, cyclohexanone, isophorone, and tetrahydrofuran; alcohols, such as methanol, ethanol, propanol , butanol, isobutyl alcohol, isopropyl alcohol, and methylcyclohexanol; esters, such as methyl acetate, butyl acetate, isobutyl acetate, isopropyl acetate, ethyl lactate, and glycol acetate; glycol ether based, such as glycol dimethyl ether, glycol monoethyl ether, and dioxane; aromatic hydrocarbons, suchasbenzene, toluene, xylene, cresol, and chlorobenzene; chlorinated hydrocarbons, such as methylene chloride, ethylene chloride, carbon tetrachloride, chloroform, ethylene chlorohydrin, and dichlorobenzene; N,N-dimethylformamide; dimethylacetamide; and hexane. The organic solvents need not be 100% pure but may contain impurities, such as isomers, unreacted materials, side reaction products, decomposition products, oxides, and moisture in addition to the main components. The content of these impurities is preferably equal to or less than 30% by weight, more preferably equal to or less than 10% by weight. As for the organic solvents used in the present invention, preferably the same kinds are used in the magnetic layer and the nonmagnetic layer, but the adding amount may be changed between the magnetic layer and the nonmagnetic layer. It is adequate to raise the stability of coating, in the nonmagnetic layer, using a solvent having a high surface tension, (e.g., cyclohexane, dioxane or the like). More specifically, it is important to design that the arithmetic mean value of the magnetic layer solvent compositions is not less than the arithmetic mean value of the nonmagnetic layer solvent compositions. To improve the dispersibility, a solvent having a strong polarity to some extent is preferred. It is also preferable that the content of the solvent having a permittivity in the range of from 15 to 20 is equal to or higher than 50% in the solvent compositions. The dissolution parameter is preferably from 8 to 11.

The thickness structure of the magnetic recording medium according to the present invention has the support having a thickness of from 1 to 100 $\mu$m, and it is particularly effective when the thin support having a thickness of from 1 to 8 $\mu$m is used.

The total thickness of the magnetic layer and the nonmagnetic layer for use is in the range of from 1/100 to 2 times as thick as the thickness of the support. In addition, an adhesive layer may be preferably formed between the support and the nonmagnetic layer to improve adhesion thereof.

The thickness of the adhesive layer is from 0.01 to 2 $\mu$m, preferably from 0.02 to 0.5 $\mu$m. A back coating layer may be formed on the surface of the support on the side opposite to the magnetic layer. The thickness of the back coating layer is from 0.1 to 2 $\mu$m, preferably from 0.3 to 1.0 $\mu$m. As the materials for the adhesive layer and the back coating layer, any of publicly known materials may be utilized.

The support usable in the present invention is a support having a micro Vickers hardness equal to or higher than 75 Kg/mm$^2$ and publicly known films subjected to biaxial stretching can be used, such as polyethylene naphthalate, polyamide, polyimide, polyamide-imide, aromatic polyamide, polybenzoxidazole and the like. In particular, the support is preferably constituted of an aromatic polyamide or polyethylene naphthalate available under the names of "Aramid" manufactured by Toray Industries, Inc. or "Aramica" manufactured by Asahi Chemical Industry Co., Ltd.

These supports maybe subjected beforehand to corona discharge treatment, plasma treatment, treatment for enhancing adhesion, heat treatment, dust removal or the like.

As for the support used in the present invention, it is general that a F-5 value in the tape running direction is preferably from 10 to 50 kg/mm$^2$, a F-5 value in the tape width direction is preferably from 10 to 30 kg/mm$^2$, and the F-5 value in the tape longitudinal direction is higher than that in the tape width direction, but it is not being limited if it is necessary that the strength, especially, in the width direction is enhanced. The thermal shrinkage of the support in the tape running direction and in the tape width direction at 100° C. for 30 minutes is preferably equal to or less than 3%, more preferably equal to or less than 1.5% , and the thermal shrinkage at 80° C. for 30 minutes is preferably equal to or less than 1%, more preferably equal to or less than 0.5%. It is preferable that the break strength in the both directions is preferably from 5 to 100 kg/mm2 and the modulus of elasticity is preferably from 100 to 2,000 kg/mm$^2$. Moreover, the light-transmittance at the wavelength of 900 nm in the present invention is preferably equal to or less than 30%, more preferably equal to or less than 3%.

The process for producing the magnetic paints for the magnetic recording medium of the present invention includes steps at least a kneading step, a dispersing step, and a mixing step to be carried out, if necessary, before or after these steps. The individual step may be performed separately at two or more stages. All of the starting materials to be used in the invention, including the ferromagnetic powder, binders, carbon black, abrasives, antistatic agents, lubricants, solvents and so on, may be added at the beginning of or during any of the steps. Moreover, the individual material may be divided and added in two or more steps; for example, polyurethane may be divided and added in the kneading step, the dispersing step, and the mixing step for viscosity adjustment after dispersing. In order to accomplish the purpose of the present invention, a conventional publicly known manufacturing technique may be utilized as a part of the process, as a matter of course. In addition, in the kneading process, it is preferable to use a kneader having a strong kneading force, such as a continuous kneader or a pressure kneader, since using those kneaders can provide a high Br. In the case where the continuous kneader or the pressure kneader is used, the ferromagnetic metal powder and all or part of the binder (preferably, equal to or higher than 30% by weight of the entire binder) are kneaded in the range of from 15 to 500 parts with respect to 100 parts of the ferromagnetic metal powder. Details of the kneading treatment are described in Japanese Unexamined Patent Publication (KOKAI) Heisei No. 1-166338 and Japanese Unexamined Patent Publication (KOKAI) Showa No. 64-79274. In the case where the magnetic layer liquid, the nonmagnetic layer liquid, the abrasive dispersing liquid or the like is prepared, a dispersing medium having a high specific gravity is desirably utilized, preferably, zirconia beads.

By way of examples, the followings can be proposed as coating apparatuses and methods for carrying out the simultaneous multilayer coating to form the magnetic recording medium having a multilayer structure of the present invention.

1. A nonmagnetic layer coated layer is first applied with a coating apparatus commonly used for magnetic paint coating, e.g., a gravure coating, roller coating, blade coating, or extrusion coating apparatus, and an upper layer is then applied, while the nonmagnetic coated layer is still in a wet state, by means of a support-pressing extrusion coating apparatus such as those disclosed in Japanese Patent Publication (KOKOKU) Heisei No. 1-46,186, Japanese Unexamined Patent Publication (KOKAI) Showa No. 60-238,179 and Japanese Unexamined Patent Publication (KOKAI) Heisei No. 2-265,672.

2. An upper nonmagnetic layer is applied almost simultaneously using a single coating head having two built-in slits for passing coating liquids, such as those disclosed in Japanese Unexamined Patent Publication (KOKAI) Showa No. 63-88080, Japanese Unexamined Patent Publication (KOKAI) Heisei No. 2-17971, and Japanese Unexamined Patent Publication (KOKAI) Heisei No. 2-265672.

3. An upper nonmagnetic layer is applied almost simultaneously using an extrusion coating apparatus with a backup roller as disclosed in Japanese Unexamined Patent Publication (KOKAI) Heisei No. 2-174965.

It is to be noted that, in order to prevent lowering the electromagnetic characteristics or the like of the magnetic recording medium by aggregation of ferromagnetic particles, shearing may preferably apply to the coating liquid in the coating head by a method such as those disclosed in U.S. Pat. No. 4,828,779 and Japanese Unexamined Patent Publication (KOKAI) Heisei No. 1-236,968. In addition, the viscosity of the coating liquid preferably satisfies the numerical range as specified in Japanese Unexamined Patent Publication (KOKAI) Heisei No. 3-8,471.

A strong orientation is preferably carried out in order to obtain the magnetic recording medium of the present invention. In the case of the magnetic tape, the orientation is carried out in a longitudinal direction. It is preferable to use a solenoid equal to or higher than 1,000 G, preferably equal to or higher than 3,000 G and a cobalt magnet in a manner that the same polarities of those above oppose to each other with the concurrent use of a magnetic field equal to or higher than 2,000 G, preferably equal to or higher than 4,000 G, further preferably equal to or higher than 6,000 G. Furthermore, it is preferable to set a proper drying process in advance before the orientation so that the post-dry orientation characteristics show the highest. In the case of the floppy disk, random orientation is taken. As for the orientating condition, the orientation in the tape longitudinal direction is carried out in the same way as that of the magnetic tape, and thereafter, the random orientation is carried out by passing through the disk in an alternating current magnetic field generator having two magnetic field intensities or the like of, for example, a magnetic field intensity of 250 gausses in a frequency of 50 Hz or a magnetic field intensity of 120 gausses in a frequency of 50 Hz.

Before the nonmagnetic layer and the magnetic layer are subjected to the simultaneous multilayer coating, it is preferred to provide an adhesive layer containing a polymer as a main component, or combine publicly known methods for enhancing the adhesiveness by carrying out corona discharge, ultraviolet radiation (UV) irradiation, or electron beam irradiation.

As the calendering treatment rolls, heat-resistant plastic rolls constituted of epoxy, polyimide, polyamide, polyimideamide or the like, or metal rolls may be used. In addition, a pair of the metal rollers, a pair of the plastic rollers, or a pair of the metal roller and the plastic roller can be used for treatment. The treatment temperature is preferably from 70 to 120° C., further preferably from 80 to 100° C. or higher. The linear pressure is preferably from 200 to 500 Kg/cm, further preferably from 300 to 400 Kg/cm or higher.

The friction coefficient of the magnetic layer plane and the opposite plane of the magnetic recording medium of the present invention with respect to SUS303J is preferably from 0.1 to 0.4, further preferably from 0.2 to 0.3, the surface specific resistivity is preferably from $10^4$ to $10^{12}$ ohms/sq, the modulus of elasticity at 0. 5% elongation of the magnetic layer in each of the running direction and the width direction is preferably from 100 to 2,000 Kg/mm$^2$, and the strength at break is preferably from 1 to 30 Kg/cm$^2$. The modulus of elasticity of the magnetic recording medium in each of the running direction and the width direction is preferably from 100 to 1,500 Kg/mm$^2$ the residual elongation is preferably equal to or less than 0.5%, the thermal shrinkage rate at any temperature of 100° C. or below is preferably equal to or less than 1%, more preferably equal to or less than 0.5%, the most preferably equal to or less than 0.1%, and ideally 0%. The glass transition temperature (i.e., the temperature at which the loss elastic modulus in dynamic viscoelasticity measurement carried out at 110 Hz is maximum) of the magnetic layer is preferably from 30° C.

to 150° C., and that of the nonmagnetic layer is preferably from 0° C. to 100° C. The loss elastic modulus is preferably in the range of from $1\times10^8$ to $8\times10^9$ dyne/cm$^2$, and the loss tangent is preferably equal to or less than 0.2.

An adhesion failure easily occurs due to excessive large loss tangent. The content of the residual solvent in the magnetic layer is preferably equal to or less than 100 mg/m$^2$, further preferably equal to or less than 10 mg/m$^2$. It is preferable that the content of the residual solvent in the magnetic layer is lower than that in the nonmagnetic layer. The void percentage of the magnetic layer is preferably equal to or less than 30% by volume, further preferably equal to or less than 20% by volume in each of the nonmagnetic layer and the magnetic layer. Although a lower void percentage is preferable for attaining higher output, there are some cases in which a certain degree of void percentage is preferably ensured according to the purpose; for example, in the case of a magnetic recording medium for data recording putting an importance on the repeating use, higher void percentage in most cases brings about better running durability.

The magnetic characteristics of the magnetic recording medium of the present invention, that is, Hc and SFD as well as Bm and Br, are shown as values given by the measurement using a vibration sample type fluxmeter (VSM) under a magnetic field of 10 kOe in an in-plane direction of the magnetic layer, unless otherwise specified. In the case of the magnetic tape, an Hc in the tape running direction is already mentioned above, and a squareness (SQ) is normally equal to or higher than 0.85, preferably from 0.85 to 0.95. The squareness in the two directions perpendicular to the tape running direction, that is, the direction parallel to the tape plane as well as perpendicular to the tape running direction and the direction vertical to the tape plane is preferably equal to or less than 80% of the squareness in the running direction. A remanence coercive force Hr in a longitudinal direction is preferably from 1800 Oe to 3000 Oe. The Hc and the Hr in a vertical direction is preferably from 1000 Oe to 5000 Oe.

A roughness of root mean square $R_{RMS}$ of the magnetic layer obtained from the evaluation by Atomic Force Micro Scope (AFM) is preferably in the range of from 2 nm to 15 nm The magnetic recording medium according to the present invention preferably comprises the nonmagnetic layer and the magnetic layer, but it will be easily presumed that the physical characteristics may be different between the nonmagnetic layer and the magnetic layer depending on the purpose. For example, the magnetic layer is made to have a high modulus of elasticity to improve running durability while, at the same time, the nonmagnetic layer is made to have a lower modulus of elasticity than that of the magnetic layer to have better head touching of the magnetic recording medium. Also, such a method can be effective in the present invention as the tensilizing method for the support is changed in order to improve the head touching. In many cases, good head touching is obtainable with the support tensilized in the direction perpendicular to the tape longitudinal direction.

EXAMPLES

The present invention is explained in detail by the following examples. "Parts" described in below represents "parts by weight", and % represents % by weight.

Ferromagnetic Metal Powder

The supports (bases) used for producing the magnetic recording medium are described in Table 1, and the kinds of the diester compounds represented by general formula (1) are described in Table 2. Here, the layers added with the diester compounds as well as the addition amount of the diester compounds are shown in Table 3.

TABLE 1

| Base | A | B | C |
| --- | --- | --- | --- |
| Kind of base | PEN | PEN | PEN |
| Thickness of base (μm) | 5.2 | 5.2 | 5.2 |
| Ra (nm) of base in Mag side | 0.7 | 1.2 | 2.2 |
| Number of projections of base in Mag side (AFM) | | | |
| 20 nm ↑ | 50 | 15 | 200 |
| 40 nm ↑ | 10 | 1 | 50 |
| Roughness of base in Mag side: AFM-PSD (nm$^2$) | | | |
| Roughness of 1 to 5 μm | equal to or less than 0.05 | equal to or less than 0.3 | equal to or less than 1.5 |
| Roughness of 4.3 μm | 0.03 | 0.21 | 1.2 |

TABLE 2

| Ester | X | Y | Second Butylstearate (S-BS) |
| --- | --- | --- | --- |
| Kinds | Diester | Diester | Monoester |
| Structure of formula (1) | | | |
| Carbon number of R1/R2 | 9 | 9 | |
| Side-chain structure | CH$_3$ | C$_2$H$_5$ | |
| Molecular weight | 412 | 428 | 340 |
| Lubricant evaporativity in preservation at 150° C. for 30 minutes | 90 | 88 | 99% |
| Melting point ° C. [DSC] | 2 | <–20 | 25 |
| Lubricant viscosity [CPS] | | | |
| 25° C. | 16 | 17 | 9 |
| 5° C. | 34 | 35 | ∞ (measurement impossible) |

Preparation of Polyurethane Resin
(Synthesis of Polyurethane Resin A)

In a container equipped with a reflux condenser and a stirrer and with the air inside replaced with nitrogen in advance, HBPA as a diol shown below, BpA-PPO700 as a diol shown below, and PPG400 and DEIS as other diols, in the mole ratio HbpA: BpA-PPO700: PPG400: DEIS of 24:14:10:2 were dissolved in a mixed solvent containing cyclohexanone and dimethylacetamide in the weight ratio of 50:50, and then dissolved at 60° C. under nitrogen stream. Here, di-n-dibutyl-tin-dilaurate may be added as catalyst by 60 ppm with respect to the total amount of the raw materials used.

Next, MDI (4,4-diphenylmethanediisocyanate) was added in the same moles as that of the total of the diols, and heating reaction was performed at 90° C. for 6 hours, and Mn 25000 of polyurethane resin A was obtained with Mw 45000 which contains ether group of 4.0 nmol/g as well as introduced —SO$_3$Na group of $8\times10^5$ mol/g.

Here, the symbols and abbreviations used are as follows:
HBpA: Hydrogenated bisphenol A (Rikabinol HB manufactured by New Japan Chemical Co., Ltd.)

BpA-PPO700: Polypropylene oxide addition product of bisphenol A (molecular weight 700)

PCL400: Polycaprolactone polyol (molecular weight 400)

PPG400: Polypropylene glycol (molecular weight 400)

DEIS: Sodium salt of bis (2-hydroxyethyl) sulfoisophthalate

With the use of the aforementioned ferromagnetic metal powder and the polyurethane resin A, following magnetic layer liquid and nonmagnetic layer liquid were prepared.

Coating liquid prescription

Prescription of Coating Liquid for Magnetic Layer

Ferromagnetic metal powder 100 parts

Hc: 2370[Oe] composition Fe/Co atomic ratio=70/30

Al/Fe=11[at %]

Y/Fe=6.7 [at %]

Mg/Fe=0.8 [at %]

Ca/Fe=0.04 [at %]

Na/Fe=0.13 [at %]

| | |
|---|---|
| SBET | 48 m$^2$/g |
| δs | 155 [emu/g] |
| SFD | 0.97 |
| Crystallite size | 160 [Å] |
| Mean length of major axis | 0.1 [μm] |
| Polyurethane resin A | 10 parts |
| Phenyl phosphonic acid (PPA) | 5 parts |
| Carbon black | 0.5 part |
| (average particle diameter: 80 nm) | |
| Alumina parts as described in Table 3 | |
| (average particle diameter: 0.18 nm) | |
| Stearic acid | 0.5 part |
| Ester (described in Table 2 and Table 3) | |
| parts as described in Table 3 | |
| Methyl ethyl ketone | 120 parts |
| cyclohexanone | 120 parts |
| [Prescription of nonmagnetic layer liquid] | |
| Nonmagnetic inorganic powder αFe$_2$O$_3$ hematite | 80 parts |
| Length of major axis: | 0.15 μm |
| Specific surface area by BET method: | 52 m$^2$/g |
| pH: | 9 |
| Tap density: | 0.8 |
| Surfaces of the particles covering with | |
| Al$_2$O$_3$ and SiO2 | |
| Carbon black | 20 parts |
| (average particle diameter: 16 nm; DBP oil absorption | |
| amount 80 ml/100 g; pH 8.0; specific surface area by | |
| BET method 250 m$^2$/g; volatile content 1.5 %) | |
| Vinyl chloride resin | 7 parts |
| (MR104 manufactured by Nippon Zeon, Co., Ltd) | |
| Polyurethane resin A | 4 parts |
| Polyisocyanate | 4 parts |
| Coronate L manufactured by Nippon Polyurethane | |
| Co., Ltd | |
| Phenyl phosphonic acid (PPA) | 3 part |
| Stearic acid | 1 part |
| Ester (described in Table 2 and Table 3) | |
| parts as described in Table 3 | |
| Methyl ethyl ketone | 120 parts |
| Cyclohexanone | 120 parts |
| Note, the following parts were prepared | |
| in Examples 3,4,5 and Comparative example 2; | |
| Methyl ethyl ketone | 240 parts |
| Cyclohexane | 240 parts |

Manufacture of Magnetic Recording Medium

Examples 1 to 5 and Comparative Examples 1 to 2

After kneading and dispersing each component of the prescription of the magnetic layer liquid and the prescription of the nonmagnetic layer liquid, the mixture was filtered using a filter having a mean pore diameter of 1 μm, thereby each coating liquid was prepared. On a surface of the support described in Table 3, the obtained coating liquids for the nonmagnetic layer and magnetic layer were coated by a simultaneous multilayer coating using an extrusion coating head in such an amount as to form the dry thickness described in Table 3. While the both layers were still in a wet state, the layers were subject to orientation by a Co-Sm magnet having a magnetic force of 6000 G and a solenoid having a magnetic force of 4000 G. After that, the layers were dried and then a back coating layer having a thickness of 0.5 μm was coated. Then, calendering process was made by passing through six nips, each of which comprising metal rollers and epoxy resin rollers under the condition at a temperature of 80° C., a linear pressure of 350 kg/cm, and a speed of 50 m/min, and then slitting it in the width of 6.35 mm, thereby producing tapes for DVC video.

Characteristics of the examples and the comparative examples of the magnetic recording medium thus obtained were measured with the following measuring method, and the results will be shown in Table 3.

Measuring Method

Magnetic characteristics (Hc, SFD, SQ, Bm): They were measured using a vibrating sample magnetometer (manufactured by Toei Kogyo Co., Ltd.) under Hm of 10 KOe.

Average thickness d and Standard deviation σ of magnetic layer:

In a case of a multilayer structure, an average thickness d of the magnetic layer and a standard deviation σ of the thickness of the magnetic layer were measured with the following methods. In a case of a magnetic layer with single layer, the measurement was also made accordingly.

The magnetic recording medium was cut across the longitudinal direction by using a diamond cutter to have a thickness of approximately 0.1 μm, and the cutting piece was observed with a transmission type electron microscope at 10,000 to 100,000-power magnification, preferably 20,000 to 50,000-power magnification, and then the photograph of the cutting piece was taken. The photograph print size was from A4 to A5 sizes. Thereafter, the interface between the magnetic layer and the nonmagnetic layer was visually determined to be bordered in black by paying particular attention to the difference in shape between the ferromagnetic metal powder and the nonmagnetic inorganic powder of the magnetic layer and the nonmagnetic layer, as well as the surface of the magnetic layer was also bordered in black. The lengths of the lines thus bordered in black were measured by using an image processing apparatus (IBAS2, manufactured by Zeiss Co. Ltd.). When a length of an sample photograph was 21 cm, measurements were made from 85 to 300 times. The average value of the measured values at this time was taken as d, and a standard deviation σ is given by following formula.

$$\sigma = \{((d1-d)^2+(d2-d)^2+ \ldots +(dn-d)^2)/(n-1)\}^{1/2}  d1, d2, \ldots dn \text{ represent the respective measured values.}$$

Symbol n is 85 to 300.

3D-MIRAU PSD: PSD (Power Spectrum Density) was calculated by multiplying a sampling interval by the square of the height, showing the power measured in nm 3unit. PSD values were calculated with respect to the roughness components at pitch of 5 μm and at pitch of 10 μm.

AFM: PSD-4.3 μm: By using NanoScope 3 manufactured by Digital Instruments, a surface roughness at a square angle measured 30 μm was measured with the quadrangular pyramid probe made of SiN having a ridge degree of 70. Power spectrum was made based on the frequency analysis of the surface roughness. PSD (Power Spectrum Density) was calculated by multiplying a sampling interval by the square of the height, showing the power measured in nm² unit. PSD value was calculated with respect to the roughness component at pitch of 4.3 μm.

AFM surface projections: By using NanoScope 3 manufactured by Digital Instruments, a surface roughness at a square angle measured 30 μm was measured with the quadrangular pyramid probe made of SiN having a ridge degree of 70. In the above-mentioned measurement of the surface roughness measured with AFM, the number of projections having a height equal to or higher than 40 nm from the standard face was counted.

AFM surface projections 20 nm ↑: The number of projections having a height equal to or higher than 20 nm from the standard face was counted in the same way as the measurement of the projections having a height equal to or higher than 40 nm (40 nm ↑).

RT SUS303S mag μ value: Under the circumstance of a temperature of 23° C. and a relative humidity of 70%, a magnetic tape was placed across a SUS303-0.2S rod having 20 mm Φ at a wrap of 90 degrees so as to keep a contact of the magnetic layer with the SUS rod, and the tape was slid repeatedly with a load of 10 g at a speed of 18 mm/s. Thus, the friction coefficient was calculated with respect to each pass on the basis of the following Euler's equation, wherein $T_2$ represents the slide resistance value.

$$\mu = (1/\pi)\ln\left(\frac{T_2}{10}\right)$$

DVC ½Tb output, Medium C/N ratio: The measurement was carried out by using a drum tester. The head used was an MIG head having Bs of 1.2 T and a gap length of 0.22 μm for recording and reproducing. The head and medium during recording and reproducing had correlative speed of 10.5 m/sec and recorded a single frequency signal of 21 MHz, and reproducing spectrum was observed with a spectrum analyzer manufactured by Shibasoku Co., Ltd. The C/N ratio was a ratio of the carrier output of 21 MHz to the noise of 18.7 MHz. [The medium C/N ratio was measured by deducting the amplifier noise from the value as mentioned above].

TABLE 3

|  | Ex. 1 | Ex. 2 | Ex. 3 | Ex. 4 | Ex. 5 | Ex. 6 | Comp. Ex. 1 | Comp. Ex. 2 |
| --- | --- | --- | --- | --- | --- | --- | --- | --- |
| Base | A | A | A | A | A | A | B | C |
| Amount of abrasives in upper layer (parts by weight) | 5 | 5 | 2 | 2 | 2 | 2 | 5 | 5 |
| Kind of ester in upper layer | S-BS | X | X | X | X | Y | S-BS | S-BS |
| Addition amount of ester in upper layer | 1.5 | 1.5 | 1.5 | 1.5 | 3.0 | 1.5 | 1.5 | 1.5 |
| Kind of ester in lower layer | S-BS | X | X | X | X | Y | S-BS | S-BS |
| Addition amount of ester in lower layer | 1.5 | 1.5 | 1.5 | 1.5 | 3.0 | 1.5 | 1.5 | 1.5 |
| Thickness d of upper layer magnetic layer: μm | 0.1 | 0.1 | 0.1 | 0.1 | 0.1 | 0.1 | 0.1 | 0.1 |
| Thickness of lower layer nonmagnetic layer: μm | 0.9 | 0.9 | 0.9 | 0.4 | 0.4 | 0.4 | 1.4 | 0.4 |
| Tape magnetic characteristics: Hc | 2260 | 2260 | 2240 | 2210 | 2220 | 2220 | 2300 | 2240 |
| SFD | 0.19 | 0.19 | 0.19 | 0.19 | 0.20 | 0.18 | 0.2 | 0.20 |
| SQ | 0.89 | 0.89 | 0.89 | 0.88 | 0.88 | 0.90 | 0.88 | 0.88 |
| Bm | 6800 | 6800 | 7200 | 6300 | 6000 | 6000 | 6300 | 5600 |
| Surface property of magnetic layer: Ra (nm³) | 1.8 | 1.8 | 1.5 | 1.3 | 1.4 | 1.4 | 2.1 | 4.0 |
| 3D MIRAU-PSD: 10 μm | 3000 | 3000 | 2500 | 2200 | 2200 | 2200 | 6000 | 12000 |
| 3D MIRAU-PSD: 5 μm | 800 | 800 | 600 | 750 | 780 | 760 | 1000 | 3000 |
| AFM: PSD-4.3 μm | 0.15 | 0.15 | 0.08 | 0.1 | 0.11 | 0.1 | 0.35 | 1.0 |
| AFM Surface projections: 40 nm ↑ | 0 | 0 | 0 | 1 | 1 | 0 | 1 | 20 |
| AFM Surface projections: 20 nm ↑ | 10 | 10 | 8 | 20 | 22 | 21 | 12 | 120 |
| DVC still durability at 23° C. and 10% (minutes) | 80 | 120 ↑ | 90 | 70 | 120 | 60 | 120 | 2 |
| RTSUS303S mag μ value | 0.30 | 0.27 | 0.28 | 0.26 | 0.30 | 0.25 | 0.32 | 0.26 |
| DVC 1/2Tb output | 0.5 | 0.5 | 0.8 | 0.2 | 0 | 0.1 | −0.5 | −5 |
| DVC medium C/N ratio | −1.8 | −1.9 | −0.6 | −1.0 | −1.1 | −1.0 | −4.0 | −7.0 |

From the results in Table 3 mentioned above, in Example 1, such base A was used as a roughness component (undulation component) of a pitch of from 1 to 5 μm is small and the number of projections having the size equal to or higher than 20 nm was few as well as the coated film was made to be 1.0 μm, thereby a roughness component of a pitch of from 1 to 5 μm on the surface of the magnetic layer can be reduced and the medium C/N ratio was improved. Since the lower layer became thinner compared with that of Comparative example 1, the amount of esters existing in the magnetic layer surface decreased, resulting in slightly lowering the still life and the μ value.

Example 2 was an example in which esters added to the upper and lower layers were changed from those of Example 1. However, the still life can be extended as well as the μ value was lowered in comparison with Example Example 3 was an example in which the addition amount of the abrasive for the upper layer was reduced compared with that of Example 2. Due to this, the undulation component and the projections on the surface of the magnetic layer were reduced compared with those of Example 2, resulting in improving the medium C/N ratio.

Example 4 was an example in which the thickness of the lower layer was reduced compared with that of Example 3. Due to reducing the thickness of the lower layer, the roughness component of a pitch of from 1 to 5μ was increased compared with that of Example 3, while the roughness component of a pitch equal to or higher than 10μ was reduced. Depending on reducing the thickness of the lower layer, the still life and the friction coefficient were lowered compared with those of Example 3, but those were not significantly lowered as those in Comparative example 2.

Example 5 was an example in which the addition amount of esters for the upper and lower layers was increased compared with those of Example 4. Due to this, the friction coefficient was increased, while the still life was also extended.

Example 6 was an example in which the kinds of esters added to the upper and lower layers were changed from those of Example 4. The still life was lowered compared with that of Example 4.

It was found that any of Examples 1 to 6 had a magnetic surface of which the roughness component of a pitch of 1 to 10 μm was small and the number of the high projections on the surface was few, the medium C/N ratio was high as well as the friction coefficient and the still durability were satisfied.

Comparative example 1 was an example in which the surface roughness component of a pitch of 4 to 10 μm, measured by 3D MIRAU or AFM, was high, as a result, the medium C/N ratio was lowered and the friction coefficient was high.

Comparative example 2 was an example in which the output and the still durability were reduced compared with those of Comparative example 1 depending on making the lower layer thin.

The present invention can provide a magnetic recording medium having the thickness of the magnetic layer equal to or less than 0.3 μm and the total thickness of the magnetic layer and the nonmagnetic layer equal to or less than 1.0 μm, wherein exhibiting a high C/N ratio and excellent in running durability under high-density magnetic recording.

What is claimed is:

1. A magnetic recording medium comprising, on either side of a flexible nonmagnetic support, a nonmagnetic layer containing a nonmagnetic powder and a binder and a magnetic layer containing a ferromagnetic powder and a binder in this order, having an average thickness of said magnetic layer of from 0.01 to 0.3 μm and a total average thickness of said magnetic layer and said nonmagnetic layer of from 0.1 to 1.0 μm, characterized in that the number of projections having a height equal to or higher than 20 nm on the magnetic layer surface measured with AFM (Atomic Force Microscope) is equal to or less than 100 pieces per 30 μm×30 μm square as well as the PSD (Power Spectrum Density) of the magnetic layer surface measured with the AFM is equal to or less than 0.2 nm² in the wavelength of from of 1 to 5 μm.

2. The magnetic recording medium according to claim 1, wherein at least one of said magnetic layer and nonmagnetic layer contains diester compounds represented by the following general formula (1):

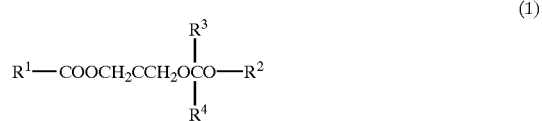

(In the formula, $R^1$ and $R^2$ represent hydrocarbon groups having a carbon number of from 7 to 12; $R^3$ and $R^4$ represent alkyl groups having a carbon number of from 1 to 6.).

3. The magnetic recording medium according to claim 1, wherein said average thickness of the magnetic layer ranges from 0.01 μm to 0.1 μm and said total average thickness of the magnetic layer and the nonmagnetic layer ranges from 0.3 to 0.6 μm.

4. The magnetic recording medium according to claim 1, wherein a surface of the support on which the magnetic layer is formed has a power spectrum density, measured with an atomic force microscope, equal to or lower than 0.15 nm² in the wavelength of from 1 to 5 μm.

5. The magnetic recording medium according to claim 4, wherein the support comprises a non-filler base having on its either surface a primer layer containing spherical silica having a particle size ranging from 10 to 20 nm.

6. The magnetic recording medium according to claim 3, wherein a thickness d2 of said nonmagnetic layer ranges from 0.2 to 0.5 μm.

7. The magnetic recording medium according to claim 1, wherein said nonmagnetic powder contained in the nonmagnetic layer is a mixture of acicular nonmagnetic particles and granulated nonmagnetic particles in which a major axis length l2 of the acicular nonmagnetic particle ranges from 0.05 to 0.5 μm, a diameter l3 of the granulated nonmagnetic particle is equal to or less than 0.05 μm, and a ratio of a thickness d2 to said major axis length l2 is equal to or less than 19.

8. The magnetic recording medium according to claim 1, wherein an amount of said binder contained in the nonmagnetic layer ranges from 5 to 30 parts by weight with respect to 100 parts by weight of the nonmagnetic powder.

9. The magnetic recording medium according to claim 1, wherein said magnetic layer contains carbon black having a particle size of from 0.02 to 0.1 μm in an amount of from 0.1 to 3 parts by weight with respect to 100 parts by weight of the ferromagnetic powder.

10. The magnetic recording medium according to claim 1, wherein said magnetic layer contains an abrasive and a number of projections of the abrasive having the size of from 5 to 15 nm is equal to or more than 1000 pieces per 30 μm×30 μm square in AFM measurement.

11. The magnetic recording medium according to claim 10, wherein a particle size of the abrasive ranges from 0.02 to 0.2 μm.

12. The magnetic recording medium according to claim 10, wherein an amount of the abrasive ranges from 1 to 5 parts by weight with respect to 100 parts by weight of the ferromagnetic powder.

13. The magnetic recording medium according to claim 1, wherein a standard deviation σ of the thickness of the magnetic layer is in the range of from 0.001 to 0.03 μm.

* * * * *